No. 667,093. Patented Jan. 29, 1901.
M. L. JUBIN & W. J. SNYDER.
COTTON CHOPPER.
(Application filed June 27, 1900.)
(No Model.)

Witnesses
Harry S. Rohrer
Herbert D. Lawson

Inventors.
Marshall L. Jubin
Wesley J. Snyder.
By Victor J. Evans Attorney

UNITED STATES PATENT OFFICE.

MARSHALL L. JUBIN AND WESLEY J. SNYDER, OF WHITNEY, SOUTH CAROLINA.

COTTON-CHOPPER.

SPECIFICATION forming part of Letters Patent No. 667,093, dated January 29, 1901.

Application filed June 27, 1900. Serial No. 21,810. (No model.)

*To all whom it may concern:*

Be it known that we, MARSHALL L. JUBIN and WESLEY J. SNYDER, citizens of the United States, residing at Whitney, in the county of Spartanburg and State of South Carolina, have invented new and useful Improvements in Cotton-Choppers, of which the following is a specification.

This invention relates to new and useful improvements in cotton-chopper attachments for plows, cultivators, &c., and its primary object is to provide an attachment which may be readily secured to devices of this character and which is simple and effective.

To these ends the invention consists in providing a disk of peculiar construction, the periphery of which is sharpened to form a cutting edge. Ridges are struck up from the disk and adapted to contact with the ground when said disk moves therealong carried by the device to which it is secured. This disk is preferably revoluble upon a rod which is secured to the plow or cultivator in any desired manner, such as will be hereinafter more fully described.

The invention also consists in the further novel construction and combination of parts hereinafter more fully described and claimed, and illustrated in the accompanying drawings, showing the preferred form of our invention, and in which—

Figure 1:
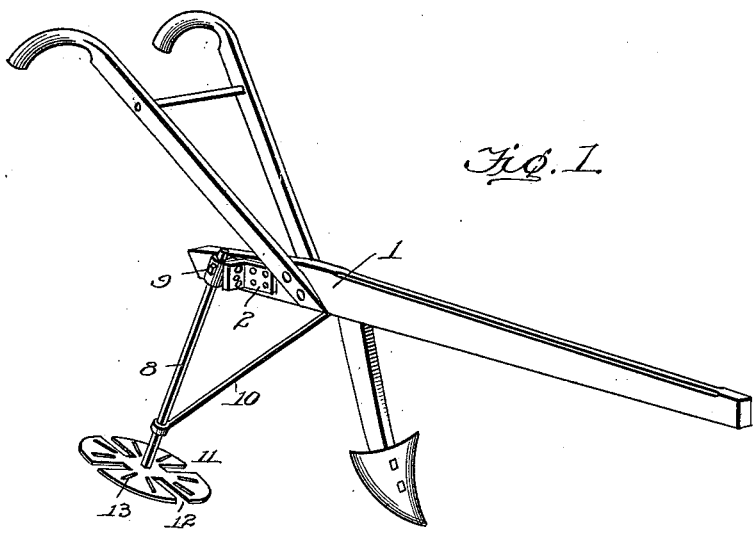
Figures 2, 3, 4, 5:
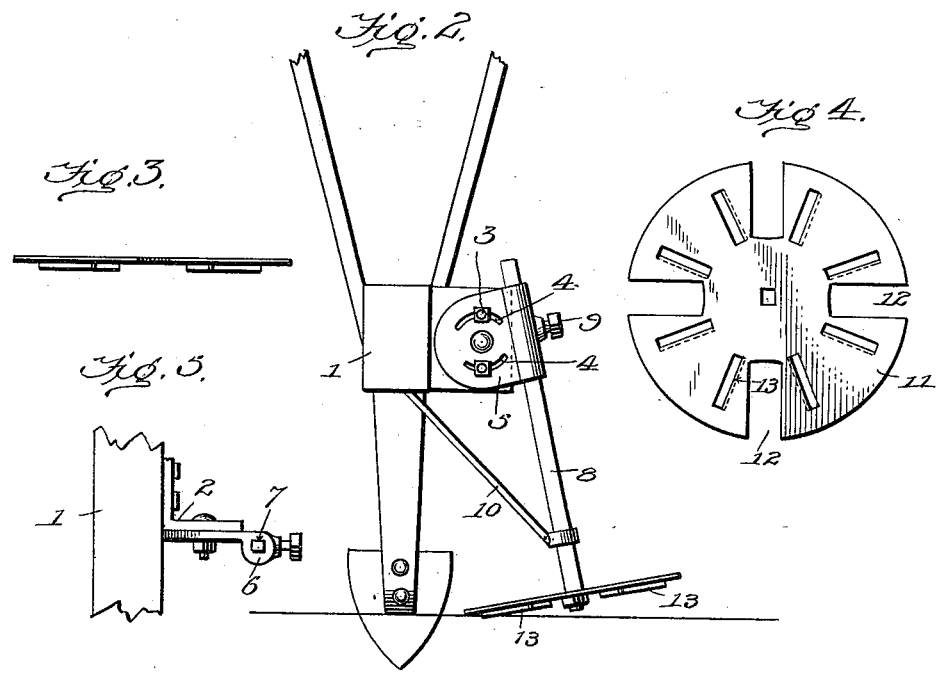

Figure 1 is a perspective view of the device attached to a plow. Fig. 2 is a rear elevation thereof. Fig. 3 is an edge view of the disk. Fig. 4 is a plan view thereof, and Fig. 5 is a plan view of the adjusting mechanism for the rod of the disk.

Referring to said figures by numerals of reference, 1 is a plow of any desired form, to which is secured a bracket 2. This bracket has an outwardly-extending portion from which project bolts 3, which extend through curved slots 4, formed within a plate 5. This plate is pivoted to the bracket and is provided at its outer edge with a thickened portion 6, through which extends a preferably squared passage 7 for the reception of a bar 8, which extends downward to a suitable distance. A set-screw 9 is fitted within the thickened portion 6 and is adapted to lock such bar in adjusted position. A suitable brace, as 10, is secured to the rod and to the beam of the plow in any desired manner.

Loosely mounted upon the lower end of the bar 8 is a disk 11 of peculiar construction. This disk is provided in its periphery with preferably four recesses or slots 12, and that portion of the periphery of the disk which lies between the recesses is sharpened. Within those portions of the disk which lie between the recesses are formed ridges 13, which are produced by striking up the metal from the surface of the disk. These ridges extend at an angle to the periphery of the disk and are for the purpose hereinafter more fully described.

The bar 8 is normally held at an angle to the ground and at such a distance therefrom as to permit the lower edge of the disk to contact therewith. When the disk is in this position, those ridges which are adjacent to the contacting edge will be partially embedded within the earth, causing the disk to revolve and bringing the cutting edge thereof into contact with the cotton. It will be seen that by this construction all gearing heretofore employed for imparting motion to the cutting-disk is dispensed with.

From the foregoing description, taken in connection with the accompanying drawings, the construction, operation, and advantages of our improved chopper attachment will be readily apparent without requiring an extended explanation. It will be seen that the device is of simple construction, that said construction permits of its manufacture at small cost, and that it is exceedingly well adapted for the purpose for which it is designed.

Various changes in the form, proportion, and the minor details of construction may be resorted to without departing from the principles or sacrificing any of the advantages of this invention.

Having thus fully described our invention, what we claim as new, and desire to secure by Letters Patent, is—

1. The combination with a bracket and a suitable support therefor; of a plate pivoted thereto; a bar adjustable within the plate; a revoluble disk upon the bar at the lower end thereof; a cutting edge to the disk, and ribs upon the lower face of the disk.

2. The combination with a bracket and a suitable support therefor; of a plate pivotally mounted upon the bracket; a bar adjustably secured within the plate; a sharpened disk loosely mounted upon the lower end of the bar and having recesses within the periphery thereof, and ribs struck up from the face of the disk.

3. The combination with a bracket and a suitable support therefor; of a plate pivoted to the bracket and having curved slots therein; bolts engaging the slots and bracket; a bar adjustably secured within the plate; a disk revoluble upon the lower end of the bar and having a sharpened edge; slots within the disk at an angle to the periphery thereof, and transversely-extending ribs struck up from the face of the disk.

In testimony whereof we affix our signatures in presence of two witnesses.

MARSHALL L. JUBIN.
WESLEY J. SNYDER.

Witnesses:
C. M. BISSELL,
C. M. ROGAN.